(12) United States Patent
Core et al.

(10) Patent No.: US 10,675,567 B2
(45) Date of Patent: Jun. 9, 2020

(54) FILTER ELEMENT ASSEMBLY

(71) Applicant: Parker Hannifin Manufacturing (UK) Ltd., Hemel Hempstead, Hertfordshire (GB)

(72) Inventors: Phillip Robert Core, Leeds (GB); Jonathan Hughes, Huddersfield (GB)

(73) Assignee: Parker Hannifin Manufacturing (UK) Ltd., Hemel Hempstead, Hertfordshire (GB)

( * ) Notice: Subject to any disclaimer, the term of this patent is extended or adjusted under 35 U.S.C. 154(b) by 0 days.

(21) Appl. No.: 16/505,779

(22) Filed: Jul. 9, 2019

(65) Prior Publication Data

US 2019/0329162 A1 Oct. 31, 2019

Related U.S. Application Data

(63) Continuation of application No. PCT/GB2018/050177, filed on Jan. 22, 2018.

(51) Int. Cl.
*B01D 35/30* (2006.01)
*F16B 33/02* (2006.01)
(Continued)

(52) U.S. Cl.
CPC ............. *B01D 29/21* (2013.01); *B01D 27/08* (2013.01); *B01D 29/96* (2013.01); *B01D 35/30* (2013.01);
(Continued)

(58) Field of Classification Search
CPC ...... B01D 29/21; B01D 35/30; B01D 63/106; B01D 2201/295; B01D 2201/301;
(Continued)

(56) References Cited

U.S. PATENT DOCUMENTS 5,593,577 A 1/1997 Imai
6,387,259 B1 5/2002 Roll
(Continued)

FOREIGN PATENT DOCUMENTS

DE 10 2013 019 807 A1 5/2015

OTHER PUBLICATIONS

Search Report for GB1701106.5 dated Jul. 5, 2017.
International Search Report and Written Opinion for PCT/GB2018/050177 dated May 4, 2018.

*Primary Examiner* — Lucas A Stelling
*Assistant Examiner* — Angel Olivera
(74) *Attorney, Agent, or Firm* — Christopher H. Hunter (57) ABSTRACT

A filter element assembly comprises a filtration media and an end fitting through which a sealing connection is made between the assembly and a housing so that the end fitting defines a flow path between the housing and the filtration media. The end fitting has first and second parts which can be separated axially, and the filter media extends axially away from the second part in a direction away from the first part. Each of the parts has an outer wall with an external threaded cylindrical surface, and each of the first and second parts has an axially facing edge surface which faces the other of the first and second parts, the facing edge surfaces shaped to define a pre-determined relative rotational alignment of the first and second parts, where the parts fit together so that the threads on the external surfaces of the parts form a continuous thread.

15 Claims, 3 Drawing Sheets

(51) Int. Cl.
*F16B 35/02* (2006.01)
*B01D 29/96* (2006.01)
*B01D 46/24* (2006.01)
*B01D 27/08* (2006.01)
*F16B 21/18* (2006.01)
*F16B 7/18* (2006.01)
*B01D 35/16* (2006.01)
*F01M 1/10* (2006.01)
*B01D 29/21* (2006.01)
*F16B 33/00* (2006.01)
*F16B 39/36* (2006.01)
*B01D 35/00* (2006.01)
*B01D 27/04* (2006.01)
*F01M 11/03* (2006.01)
*B01D 63/10* (2006.01)

(52) U.S. Cl.
CPC .......... *B01D 46/2414* (2013.01); *F16B 33/02* (2013.01); *F16B 35/02* (2013.01); *B01D 27/04* (2013.01); *B01D 35/005* (2013.01); *B01D 35/16* (2013.01); *B01D 63/106* (2013.01); *B01D 2201/0415* (2013.01); *B01D 2201/291* (2013.01); *B01D 2201/295* (2013.01); *B01D 2201/30* (2013.01); *B01D 2201/301* (2013.01); *B01D 2201/305* (2013.01); *B01D 2201/306* (2013.01); *B01D 2201/4046* (2013.01); *B01D 2201/4053* (2013.01); *B01D 2201/4061* (2013.01); *B01D 2201/4076* (2013.01); *B01D 2201/4092* (2013.01); *B01D 2313/02* (2013.01); *B01D 2313/04* (2013.01); *B01D 2313/13* (2013.01); *B01D 2313/20* (2013.01); *B01D 2313/21* (2013.01); *C02F 2201/004* (2013.01); *C02F 2201/006* (2013.01); *F01M 1/10* (2013.01); *F01M 11/03* (2013.01); *F01M 2001/1028* (2013.01); *F01M 2011/031* (2013.01); *F16B 7/182* (2013.01); *F16B 21/186* (2013.01); *F16B 33/004* (2013.01); *F16B 33/006* (2013.01); *F16B 39/36* (2013.01); *Y10S 210/17* (2013.01); *Y10T 403/32491* (2015.01); *Y10T 403/556* (2015.01)

(58) Field of Classification Search
CPC ...... B01D 2201/4046; B01D 2201/306; B01D 2201/4076; B01D 2201/305; B01D 2201/291; B01D 2201/0415; B01D 27/08; B01D 46/2414; B01D 29/96; B01D 2313/13; B01D 2313/02; B01D 2313/20; B01D 2313/21; B01D 2201/30; B01D 2201/4053; B01D 2201/4061; B01D 35/16; B01D 27/04; B01D 35/005; B01D 2313/04; F16B 33/006; F16B 35/02; F16B 33/02; F16B 39/36; F16B 7/182; F16B 21/186; F16B 33/004; Y10T 403/32491; Y10T 403/556; C02F 2201/004; C02F 2201/006; Y10S 210/17; F01M 2011/031; F01M 11/03; F01M 2001/1028; F01M 1/10
See application file for complete search history.

(56) References Cited

U.S. PATENT DOCUMENTS

| | | | |
|---|---|---|---|
| 6,595,372 B1 | 7/2003 | Takahiro | |
| 7,232,522 B1 | 6/2007 | Lasley | |
| 8,425,773 B2 | 4/2013 | Bonta | |
| 2004/0018043 A1* | 1/2004 | Yu | F16B 7/182 403/109.4 |
| 2005/0000886 A1 | 1/2005 | Reynolds | |
| 2015/0144549 A1 | 5/2015 | Kreibig | |
| 2017/0136412 A1* | 5/2017 | Huda | C02F 1/001 |

* cited by examiner

FILTER ELEMENT ASSEMBLY

This application is a continuation application pursuant to 35 U.S.C. § 120 of PCT/GB2018/050177 filed on Jan. 22, 2018 which claims the benefit of G.B Application No. 1701106.5 filed Jan. 23, 2017, the disclosures of which are incorporated herein by reference.

FIELD OF THE INVENTION

This invention relates to a filter element assembly which includes a filter element, and to a filter assembly which can include a filter element. The filter components provided by the invention can be used to remove contaminants from a fluid, especially particulate contaminants. The fluid can be a liquid or a gas.

BACKGROUND

Filters which are used to remove contaminants from a fluid frequently include a filter element which is mounted in a housing. The filter element includes a filter media. The fluid flows through the filter media so that contaminants in the fluid are retained in the media. The housing includes an inlet through which the fluid is supplied to the filter element, and an outlet through which the fluid can be discharged from the filter after it has been filtered by flowing through the filter media. The material of the filter media is selected according to the nature of the fluid, the nature of the contaminants, and the operating conditions of the filter.

The filter element can include at least one end fitting. Such end fittings are sometimes also referred to as end caps. The filter media can be fastened to the end fitting. Frequently, the filter element will be generally cylindrical with a wall that is provided by the filter media so that a fluid which is to be filtered flows through the wall, either from inside to outside, or from outside to inside. An end fitting can be provided at one or at each of the ends of the cylindrical wall. An end fitting can provide features by which the filter element is located within the filter housing. An end fitting can be fastened to the filter media using an adhesive, or by a welding technique which involves causing the material of the end cap or the media or both to fuse, as is well known. An end fitting can have a groove in which the end of the filter media can be received and fastened. A filter element can include an end fitting at each end. End fittings at opposite ends of a filter element can have different features. For example, features on an end fitting at one end of a filter element for locating the filter element within a filter housing might be omitted from the end fitting at the opposite end of the element.

It is common for a filter element to be capable of being removed from the housing for replacement, in particular when its capacity to absorb contaminants is limited. It is generally important for efficient operation of the filter that the filter element is located securely within the housing and that seals are created reliably between corresponding surfaces of the filter element and the housing to ensure that the fluid which is to be filtered is not able to flow between the inlet and outlet in the housing without having to flow through the filter media.

A filter element can be secured within a housing by means of cooperating threads on the element and the housing. Threads can be provided on an external surface of the filter element and an internal surface of the housing. The threads on an external surface of the filter element can be provided on an end fitting of the element.

SUMMARY

A filter element assembly is provided in which an end fitting has first and second parts which can be separated axially, with facing edge surfaces which are shaped to define a pre-determined relative rotational alignment of the first and second parts in which the first and second parts fit together so that threads on the external surfaces of the first and second parts form a continuous thread.

A filter element assembly is therefore provided which comprises a filtration media and an end fitting through which a sealing connection is made between the filter element and a housing so that, when the sealing connection is made, the end fitting defines in part a flow path for fluid between the housing and the filtration media, in which the end fitting has first and second parts which can be separated axially, the filter media extending axially away from the second part in a direction away from the first part, each of the first and second parts having an outer wall with an external cylindrical surface which is threaded, and in which each of the first and second parts has an axially facing edge surface which faces the other of the first and second parts, the facing edge surfaces being shaped to define a pre-determined relative rotational alignment of the first and second parts in which the first and second parts fit together so that the threads on the external surfaces of the first and second parts form a continuous thread.

The filter element assembly has the advantage that the first and second parts of the end fitting should be assembled with one another in the pre-determined relative rotational alignment in order for the threads on the first and second parts to be engaged easily with a thread on the internal wall of a housing.

Optionally, the facing surface of each of the first and second parts faces the corresponding surface of the other part in a generally axial direction so that movement of one part towards the other part along the axis of the assembly results in a reduction in the distance between the facing surfaces. Each of the facing surfaces can be arranged so that it defines a plane which is approximately perpendicular to the axis of the assembly. The facing surfaces can be arranged so that the planes defined by the surfaces are inclined to the axis. When one or more of the facing surfaces has one or more discontinuities in the form of protrusions and recesses, the plane defined by such a facing surface is that defined by the portion or portions of the surface other than those provided by the protrusions and/or recesses.

Optionally, one of the facing surfaces defines an axially extending protrusion and the other of the facing surfaces defines an axially extending recess in which the protrusion can be received when the rotational alignment of the first part relative to the second part is the pre-determined relative rotational alignment. The one or more protrusions and recesses on the facing surfaces can preclude separate engagement of the threads on the first and second parts with the thread on the internal wall of a housing when the first and second parts of the end fitting are not fully assembled with one another. The one or more protrusions and recesses on the facing surfaces can preclude separate engagement of the threads on the first and second parts with the thread on the internal wall of a housing when a protrusion on one of the parts of the end fitting is not capable of fitting into a recess on the other part, for example when the parts of the end fitting are not intended to be used together.

The axially facing surfaces can define a plurality of axially extending protrusions and recesses. When there are several protrusions and several recesses, it might be that all of the protrusions are on the facing surface of one of the parts of the end fitting with all of the recesses provided on the facing surface of the other of the parts of the end fitting. When there are several protrusions and several recesses, it might be that one or more of the protrusions and one or more of the recesses are provided on the facing surface of one of the parts of the end fitting with the other protrusion(s) and recess(es) provided on the facing surface of the other of the parts of the end fitting.

The facing surfaces of a protrusion(s) and/or a recess(es) can be provided by an axially facing edge of a cylindrical outer wall of a part of the end fitting.

Optionally, the continuous thread is provided in part by a thread on the external cylindrical surface of the protrusion.

Optionally, the external cylindrical surface of the protrusion extends axially, continuously from the external cylindrical outer surface of the part of the end fitting on which the protrusion is provided. There will then be no step or other discontinuity between the cylindrical surface of the protrusion and the cylindrical surface of the remainder of the part of the end fitting.

Optionally, the continuous thread has a lead in which is located on the external surface of the part in which the recess is formed. Relying on a lead in for the thread on the part in which the recess is formed to initiate threaded engagement between the two parts of the end fitting and a housing can mean that the part of the end fitting in which the recess is formed must be present in order for the thread on the end fitting to be engaged easily with the thread on a housing. This can therefore mean that the two parts of the end fitting must be assembled together in order for the thread on the end fitting to be engaged easily with the thread on the housing. The absence of a lead in on the thread on the part on which the protrusion is provided can mean that it is difficult to engage that part with the thread on the housing in the absence of the part in which the recess is formed.

Optionally, the continuous thread has a lead in which is located on the protrusion. Relying on a lead in for the thread on the protrusion to initiate threaded engagement between the two parts of the end fitting and a housing can mean that the part of the end fitting which provides the protrusion must be present in order for the thread on the end fitting to be engaged easily with the thread on a housing. This can therefore mean that the two parts of the end fitting must be assembled together in order for the thread on the end fitting to be engaged easily with the thread on the housing.

Optionally, a thread lead in can be provided on the protrusion without a thread lead in also being provided on the part of the end fitting in which the recess is formed. Optionally, a thread lead in can be provided on the protrusion and a thread lead in can be provided separately on the part of the end fitting in which the recess is formed.

The thread on the end fitting can be a multistart thread, for example a double start thread, in which each of the thread starts has a respective lead in. The lead ins for first and second threads can be provided on the same one of the first and second parts. The lead ins for first and second threads can be provided on different ones of the first and second parts. It can be preferred that lead ins for each of first and second threads are provided on first and second protrusions respectively which are both provided on either the first part or the second part.

Optionally, at least one protrusion is defined on the facing surface of the first part of the end fitting and at least one recess is defined on the facing surface of the second part of the end fitting.

Optionally, the facing surface on the first part defines first and second axially extending protrusions and the facing surface on the second part defines first and second axially extending recesses for receiving the first and second protrusions respectively, in which the axial length of the first protrusion is different from that of the second protrusion. Different axial lengths can mean that it is difficult to locate the first part relative to a housing so that threads on the first part engage threads on the inside wall of the housing.

More than two protrusions, with corresponding recesses, might be provided.

Optionally, there is a single rotational alignment of the first part of the end fitting relative to the second part of the end fitting in which the threads on the external surfaces of the first and second parts form a continuous thread. This can be achieved when there is a single protrusion that is received in a corresponding single recess. It can also be achieved when two or more protrusions are provided which are received in two or more corresponding recesses, where the arrangement of the protrusions and recesses is non-uniform around the axis of the assembly. For example, the spacing between the protrusions might be unequal, or the shape or size or both of one of the protrusions might be different from that of another of the protrusions.

Optionally, the facing surfaces of the first and second parts of the end fitting, between them, can have (a) first and second axially extending protrusions and (b) first and second axially extending recesses arranged so that the first protrusion can be received in the first recess and the second protrusion can be received in the second recess when the rotational alignment of the first part relative to the second part is the pre-determined relative rotational alignment.

Optionally, the protrusion can taper inwardly towards its free end when the protrusion is viewed from one side. The recess can have a similar taper. This can allow the protrusion to be fitted tightly into the recess with the tapered side walls of the protrusion in contact with the tapered side walls of the recess. This can help to define the pre-determined relative rotational alignment of the first and second parts of the filter element end fitting. The protrusion can be rounded at its free end, with a convex shape. The recess can then have a corresponding concave shape.

At least some of the edge which defines the protrusion can be rounded when the protrusion is viewed from one side. At least some of the edge which defines the protrusion can be straight when the protrusion is viewed from one side.

The first and second parts of the end fitting can have principal facing surfaces which extend at least part way across the first and second parts and are defined outwardly by the cylindrical walls of the first and second parts. The principal facing surface might extend entirely across the part of the end fitting (for example as in the case of a closure cap). The principal facing surface might be annular so that it defines an opening. For example, a principal facing surface might be provided by an axially facing surface of an end cap which covers the cylindrical end wall defined by a laminate of filter media material. At least one projection can be provided on the principal facing surface of one of the parts and a corresponding socket can be provided on the principal facing surface of the other of the parts. Two or more projections can be provided on each of the principal facing surfaces. Each projection can be a snug fit in its corresponding socket so that, when the or each projection is received in its corresponding socket, the engagement of the projections in their corresponding sockets resists separation of the first and second parts. The engagement of the projections in the sockets can also enable torque to be transferred between the first and second parts. A formation can be provided on a wall of a projection or a socket to increase the resistance to separation of the projection and socket, for example by providing a latch or by increasing frictional forces.

Optionally, the filtration media is formed as a cylindrical wall and the second part of the end fitting is an annular part which is provided on an end of the cylindrical wall. The first part can be another annular part, for example provided at an end of a separate filter media component which can be arranged coaxially with the filter media which is fastened to the second part of the end fitting.

The first part of the end fitting can be a cap which covers the opening extending through the second part of the end fitting. A cap can be used to close a filter housing body with a filtration media in position within the housing body (a housing closure cap). A cap can be separated from a filter housing body to open the housing so that an element within the housing can be removed and then replaced. In the filter element assembly presented in this document, the housing closure cap and the filter element are connected to and separated from the filter housing body together, with the closure cap and the annular part at the end of the cylindrical filtration media wall forming a composite end fitting of the filter element.

Features which are discussed above can prevent one part of the end fitting being threadingly engaged with the housing body when that part is not assembled with the other part of the housing body. For example, when the first and second parts of the end fitting are annular parts, each of which is provided at an end of one of a pair of coaxially arranged filter media components, the features discussed above can mean that one part cannot readily be threadingly engaged with a thread in the housing body without the other part also being present. When the first part of the end fitting is a closure cap, the features discussed above can mean that neither the second part with its filter media nor the closure cap can be threadingly engaged with a thread on the housing body in the absence of the other part.

Optionally, the first part of the end fitting has a groove formed in its external cylindrical surface, and an O-ring positioned in the groove. For example, when the first part of the end fitting is a cap which is used to close a filter housing, the seal on the first part can be used to ensure that the filter housing is sealed closed.

Optionally, the first and second parts of the end fitting include latch formations which allow the first and second parts of the end fitting to be connected to one another when the rotational alignment of the first part relative to the second part is the pre-determined relative rotational alignment. For example, one of the parts of the end fitting can have at least one deformable finger, preferably a plurality of deformable fingers, which extend towards the other part. Each of the fingers can have a latch portion towards its free end which can be received in a recess when the first and second parts are fully assembled together. The first and second parts can be separated from one another by deforming the fingers so that the latch portions are released from their respective recesses.

Also provided is a filter assembly which comprises a filter element assembly as discussed above and a housing having a cavity in which the filter element can be received, the cavity having an inner wall which has a thread formed in it which can engage the thread formed in the cylindrical outer surface of the end fitting.

The housing is open at one end to allow the filter element to be positioned in the cavity within the housing. The thread can be formed on the inner wall of the housing at the open end of the housing. The housing can be arranged in use so that its open end is an upper end. The housing can be arranged in use so that its open end is a lower end.

When the housing is open at one end to allow the filter element to be positioned within the housing, connections between the filter element and ports for the process fluid can be made at the end of the housing which is opposite to the open end.

The filter element can include a cylindrical wall of a filter media which is arranged so that the fluid which is to be filtered flows through the wall between a first port which communicates with a central axial cavity within the filter element and a second port which communicates with the circumferential space around the outside of the element. The second port will frequently be at or adjacent to an end of the filter element. The second port can be at or adjacent to the same end of the filter element as the first port. The second port can be at or adjacent to the opposite end of the filter element from the first port.

The filter assembly can be designed to operate with the fluid to be filtered flowing through the wall of the filter element from the inside to the outside. The filter assembly can be designed to operate with the fluid to be filtered flowing through the wall of the filter element from the outside to the inside.

The material of the filter media is selected according to the intended application for the filter. The filter might be used to filter a pressurised gas, such as for example compressed air. The filter might remove particulate contaminants from the gas including aerosol droplets. The filter might be used to filter a liquid. The filter can remove solid particles from the liquid. The filter can be used to separate an immiscible liquid contaminant from a process liquid, for example to remove water from a hydrocarbon fuel. Examples of materials for the filter media include open cell foam materials, paper or other cellulosic materials, materials made from non-woven fibres, such as for example melt blown fibres, which might be made from polymers such as polyesters and polyamides.

At least one of the parts of the end fitting can be formed from a polymeric material by moulding. Each of the first and second parts of the end fitting can be formed from a polymeric material by moulding. Materials which can be used in this way in the manufacture of filter element end fittings are known. The selection of a suitable material will depend on the application for the filter element including for example the materials to which it will be exposed when in use and the conditions (for example temperature and differential pressure across the element). Filter media can be fastened within an axially facing groove in an end fitting using an adhesive material, as is known.

The material from which the housing is made will be selected according to the conditions and materials to which the filter will be exposed when in use. It can be preferred to make the housing from a polymeric material for some applications. Use of a polymeric material can have the advantage of light weight and ease of manufacture by a moulding process. Examples of suitable polymeric materials include polyolefins, polyamides, polyesters. A polymeric material which is used to make the housing can be reinforced with fibres. It can be preferred to make the housing from a metal. Use of a metal can have the advantage that the housing is resistant to damage, for example due to impact. Examples of metals which can be used to make the housing include steels, and aluminium and its alloys. When the first part of the end fitting is a cap, it can be made from the same material as the housing.

BRIEF DESCRIPTION OF THE DRAWINGS

Filter assemblies and filter element assemblies, and components thereof, are described below by way of example with reference to the accompanying drawings, in which.

DETAILED DESCRIPTION

Figure 1:
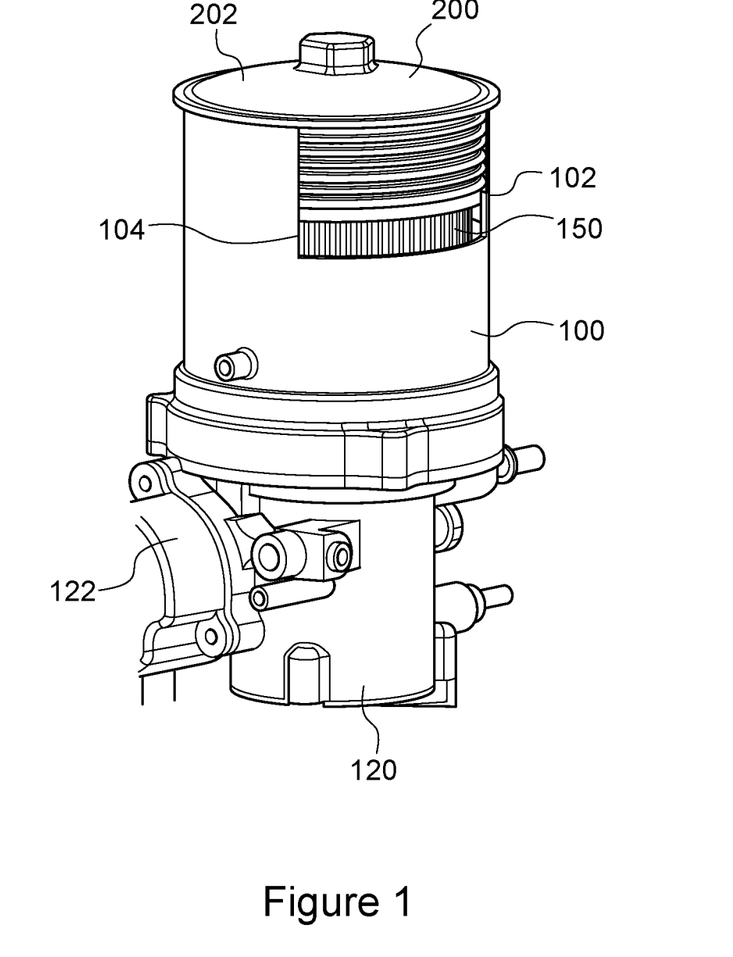
FIG. 1 is an isometric view of a filter assembly in place on a fuel pump system, with a window formed in the filter housing so that a portion of the filter element within the housing is visible.
Figure 2:
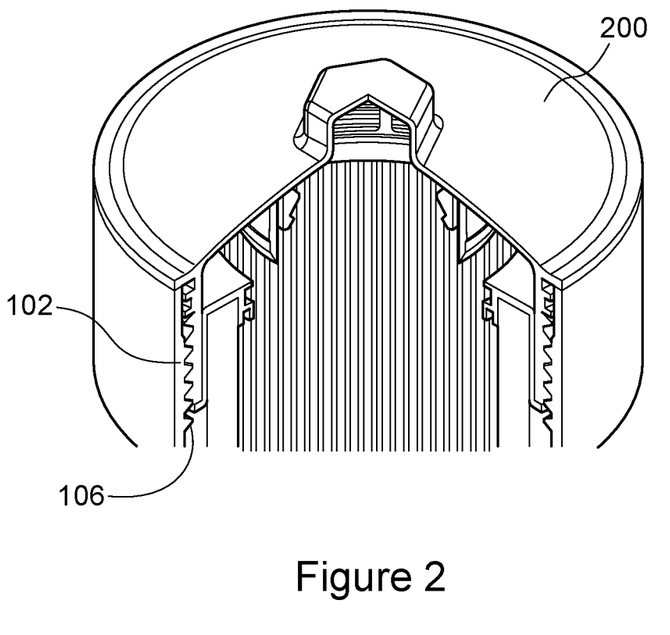
FIG. 2 is an isometric view, partially in section, of the top portion a filter assembly which comprises a filter element and a housing having a closure cap.

Referring to the drawings, FIGS. 1 and 2 show a filter assembly which comprises a housing body 100 and a filter element 150 located within the housing body. The assembly includes a closure cap 200 for the housing.

The filter housing body 100 has a cylindrical wall 102 with a circular cross-section and is open at one end (the end shown in FIG. 2). The filter element 150 is visible in FIG. 1 within the housing body through a window 104 in the wall 102 of the housing body which is shown in FIG. 1 for the purpose of illustration. It is envisaged that the wall of the housing body would not normally in practice have a window formed in it. The housing body has openings at its other end for fluid to flow into the housing body for filtration and for fluid to flow out of the housing body after it has been filtered. The housing body can be made from a metallic material such as a steel or an aluminium alloy. The housing body might be made from a polymeric material.

As can be seen in FIG. 2, the cylindrical wall 102 of the housing body has a thread 106 formed in its internal surface at the open end. The thread extends up to the edge of the cylindrical wall at the open end of the housing body.

The filter assembly can be used in an application in which a process liquid such as a hydrocarbon fuel is treated to remove contaminants, which might be particulate solids, or droplets of an immiscible liquid, especially an aqueous liquid. The filter housing 100 is shown in FIG. 1 attached to a drain module 120 through which collected liquid contaminants which have been separated from the process liquid can be drained. A pump module 122 is shown connected to the filter assembly. The pump module 122 can be used to pump a fluid into the filter assembly or to cause a liquid to be withdrawn from the filter assembly.

The filter housing can be provided with ports through which fluids (such as the process liquid, or fluids used to clean the filter) can be supplied to or withdrawn from the housing.

Figure 3:
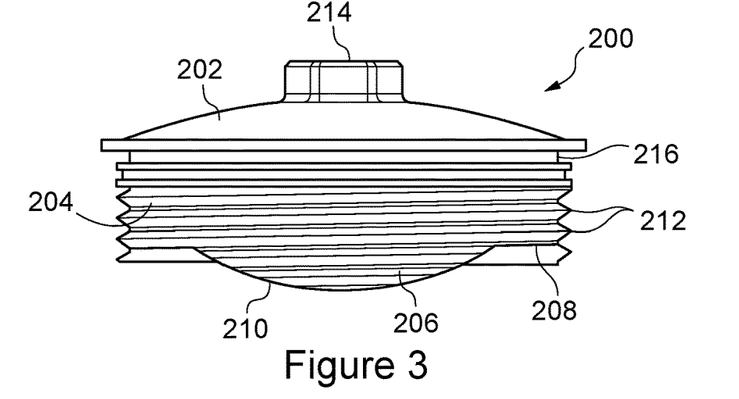
FIG. 3 is a side view of the closure cap for the housing of the filter assembly shown in FIG. 2.

FIG. 3 shows the closure cap 200 for the housing, which has a domed portion 202 and an annular wall 204. The diameter of the annular wall 204 of the closure cap is such that it will fit within the open end of the housing body. The diameter of the domed portion 202 is larger than the diameter of the housing body so that the domed portion overlaps the wall of the housing body when the closure cap is fully seated on the annular wall.

The annular wall 204 of the closure cap 200 has a protrusion 206 extending from its lower edge 208 in a direction parallel to the axis of the closure cap. The protrusion has a convex lower edge 210. The external surface of the protrusion extends continuously from the external surface of part of the annular wall from which the protrusion extends so that there is no step or other discontinuity between the protrusion and the remainder of the wall.

The closure cap can have more than one such protrusion. For example, the closure cap can have two or three protrusions spaced apart around its lower edge. The arrangement of the protrusions can be such that the order or rotational symmetry of the closure cap is zero. For example, when there are two protrusions, the protrusions can differ from one another in terms of their dimensions or can be arranged so that one is not directly opposite to the other (the angle between them subtended at the axis is not equal to 180°), or both.

A thread 212 is formed in the external surface of the annular wall of the closure cap, including the external wall of the protrusion. The thread on the wall of the closure cap does not have a tapered lead in.

A groove 216 is provided between the upper edge of the thread 212 and the outer edge of the domed portion 202 which can receive an O-ring seal (not shown).

A hexagonal projection 214 is provided on the domed portion, which can be engaged by a tool such as a spanner or wrench so that torque can be applied to the closure cap.

Three sockets (not shown) are formed in the underside of the domed portion of the closure cap.

Figure 4:
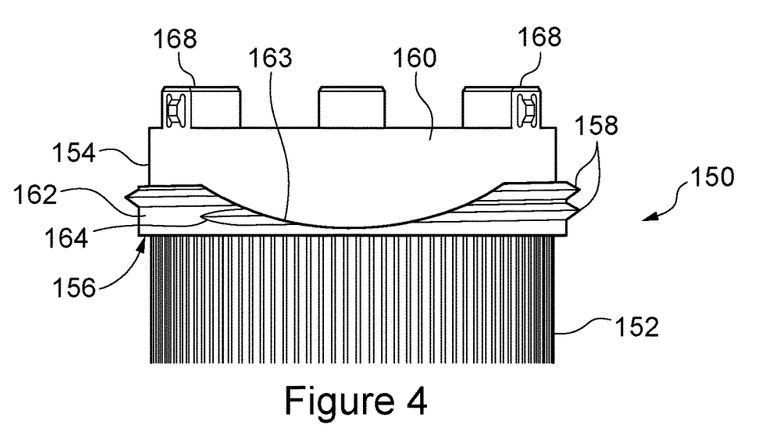
FIG. 4 is a side view of the top portion of the filter element which is included in the filter assembly shown in FIG. 2.

FIG. 4 shows the filter element 150, having a cylindrical wall 152 with a circular cross-section provided by filter media which comprises one or more layers of filter media material. The filter media will be selected dependent on the fluid which is to be filtered and the contaminants which are to be separated from the fluid. The filter media can include a layer of a pleated paper. A paper filter media which is to be used to remove aqueous contaminants from an organic liquid such as a hydrocarbon fuel can be coated with a hydrophobic material which can help to separate the contaminants from the organic liquid. The filter media can include a layer of an open cell coalescing foam which can help to cause contaminant liquid droplets to coalesce. The filter media can include a mesh. A mesh layer which is to be used to remove aqueous contaminants from an organic liquid such as a hydrocarbon fuel can be coated with a hydrophobic material which can help to separate the contaminants from the organic liquid. Factors affecting the selection of appropriate filter media for use in such filter elements are well understood.

The filter element includes an end cap 154. The end cap has an annular groove 156 in which the top edge of the cylindrical filter media wall 152 is received. The filter media can be retained in the groove by means of a bonding material such as an adhesive or by a welding technique which involves causing the material of the end cap or the media or both to fuse. Such techniques are known. A similar end cap can be used at the other end of the filter element where the bottom edge of the cylindrical filter media wall is received in a groove. Such filter element constructions are well known.

The external wall of the end cap 154 has a turret portion 160 which provides the top edge of the end cap, and a collar portion 162 which is spaced apart from the top edge of the end cap. The diameter of the turret portion is such that it can be received within the annular wall of the closure cap with a sliding fit. The diameter of the collar portion is greater than the diameter of the turret portion, so that the collar portion cannot be received within the annular wall of the closure cap. An axially facing concave recess 163 is formed in the outer wall of the collar portion of the end cap wall. More than one axially facing concave recess can be provided in the collar portion of the end cap wall to match the number and configuration of the protrusions 206 which are formed in the lower edge 208 of the annular wall 204 of the closure cap 200.

A thread 158 is formed in the external surface of the collar portion 162 of filter element end cap 154. The thread spans the recess 162 which is formed in the collar portion of the end cap. The thread has a tapered lead in 164.

Locator projections 168 are formed in the top surface of the end cap 154. The end cap shown in the drawings has three such projections. Each of the projections is a snug fit in a respective one of the sockets which are formed in the underside of the domed portion of the closure cap so that, when the projections are received in the sockets, they resist separation of the closure cap from the filter element. The reception of the projections in the sockets means that torque which is applied to the closure cap is transferred to the end cap of the filter element.

Figure 5:
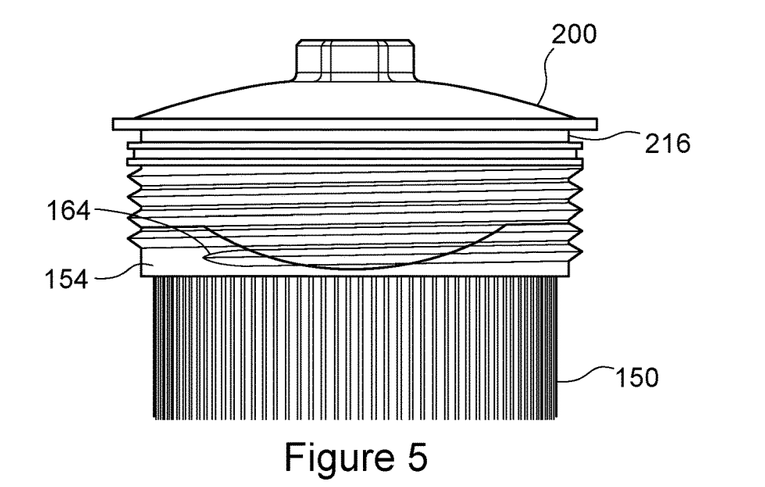
FIG. 5 is a side view of the closure cap and the filter element shown in FIGS. 3 and 4 respectively, assembled together for mounting in the housing of the filter assembly as shown in FIG. 2.

FIG. 5 shows the closure cap 200 and the filter element end cap 154 fitted together, with the turret portion 160 of the end cap received within the annular wall of the closure cap. The surface which is provided by the lower edge of the closure cap, including the lower edge of the protrusion (or protrusions), faces the surface which is provided by the upper edge of the collar portion of the external wall of the filter element end cap, including the upper edge of the recess (or recesses). The protrusion on the lower edge of the closure cap can be received in the recess in the upper edge of the collar portion when the protrusion and the recess are aligned. The tapered shapes of the protrusion and the recess mean that the closure cap become more tightly engaged against rotation relative to the end cap as the closure cap and the end cap are progressively fitted together. When the closure cap and the end cap are fully fitted together to form a composite end fitting, the threads on the closure cap and the end cap become aligned so that they provide a continuous thread, extending from the lead in 164 on the end cap to the top of annular wall 204 of the closure cap.

The end fitting provided by the closure cap 200 and the filter element end cap 154 can be fitted into the filter housing body 100 by engaging the thread 158, 212 which extends from the lead in 164 on the end cap on to the annular wall of the closure cap 200 with the thread 106 on the internal surface at the open end of the housing body. Torque can be applied to the end fitting by means of a spanner or wrench which engages the hexagonal projection 214 on the closure cap, driving the filter element with the closure cap into the housing body 100 until an O-ring in the groove 216 in the closure cap is compressed between the closure cap and the internal surface of the cylindrical wall 102 of the housing body at its upper edge.

The absence of a thread lead in on the closure cap 200 means that the closure cap cannot easily be fitted on to the housing body 100 in the absence of a filter element.

The housing body has an inlet for fluid which is to be filtered and an outlet for fluid which has been filtered. These are commonly provided at one end of the housing (the lower end in the assembly shown in FIG. 1). Locating the filter in the housing causes a first flow path to be created between the fluid inlet and the annular space between the inside of the wall of the housing body and the outside of the cylindrical filter media wall, and a second flow path to be created between the cylindrical cavity within the filter element and the fluid outlet.

The invention claimed is:

1. A filter element assembly which comprises a filtration media and an end fitting through which a sealing connection is made between the filter element assembly and a housing so that, when the sealing connection is made, the end fitting defines in part a flow path for fluid between the housing and the filtration media, in which the end fitting has first and second parts which can be separated axially, the filtration media extending axially away from the second part in a direction away from the first part, each of the first and second parts having an outer wall with an external cylindrical surface which is threaded, and in which each of the first and second parts has an axially facing edge surface which faces the other of the first and second parts, the facing edge surfaces being shaped to define a pre-determined relative rotational alignment of the first and second parts in which the first and second parts fit together so that the threads on the external surfaces of the first and second parts form a continuous thread.

2. The filter element assembly as claimed in claim 1, in which one of the facing surfaces defines an axially extending protrusion and the other of the facing surfaces defines an axially extending recess in which the protrusion can be received when the rotational alignment of the first part relative to the second part is the pre-determined relative rotational alignment.

3. The filter element assembly as claimed in claim 2, in which the continuous thread extends on to the external cylindrical surface of the protrusion.

4. The filter element assembly as claimed in claim 3, in which the external cylindrical surface of the protrusion extends continuously from the external cylindrical outer surface of the part of the end fitting on which the protrusion is provided.

5. The filter element assembly as claimed in claim 2, in which the continuous thread has a lead in which is located on the external surface of the part of the end fitting in which the recess is formed.

6. The filter element assembly as claimed in claim 2, in which the continuous thread has a lead in which is located on the protrusion.

7. The filter element assembly as claimed in claim 2, in which the protrusion is defined on the facing surface of the first part of the end fitting and the recess is defined on the facing surface of the second part of the end fitting.

8. The filter element assembly as claimed in claim 2, in which the protrusion tapers inwardly towards its free end when the protrusion is viewed from one side.

9. The filter element assembly as claimed in claim 8, in which the protrusion is rounded at its free end.

10. The filter element assembly as claimed in claim 1, in which there is a single rotational alignment of the first part of the end fitting relative to the second part of the end fitting in which the threads on the external surfaces of the first and second parts form a continuous thread.

11. The filter element assembly as claimed in claim 1, in which the facing surfaces of the first and second parts of the end fitting, between them, have (a) first and second axially extending protrusions and (b) first and second axially extending recesses arranged so that the first protrusion can be received in the first recess and the second protrusion can be received in the second recess when the rotational alignment of the first part relative to the second part is the pre-determined relative rotational alignment.

12. The filter element assembly as claimed in claim 1, in which the filtration media is formed as a cylindrical wall and the second part of the end fitting is an annular part which is provided on an end of the cylindrical wall, and in which the first part of the end fitting is a cap which covers the opening which extends through the second part of the end fitting.

13. The filter element assembly as claimed in claim 12, in which the first part of the end fitting has a groove formed in its external cylindrical surface, and an O-ring positioned in the groove.

14. The filter element assembly as claimed in claim 1, in which the first and second parts of the end fitting include latch formations which allow the first and second parts of the end fitting to be connected to one another when the rotational alignment of the first part relative to the second part is the pre-determined relative rotational alignment.

15. A filter assembly which comprises a filter element assembly as claimed in claim 1, and a housing having a cavity in which the filter element assembly can be received, the cavity having an inner wall which has a thread formed in it which can engage the thread formed in the cylindrical outer surface of the end fitting.

* * * * *